US012529989B2

(12) United States Patent
Shimizu

(10) Patent No.: US 12,529,989 B2
(45) Date of Patent: Jan. 20, 2026

(54) DRUM UNIT INCLUDING DRUM FRAME TO WHICH DEVELOPING CARTRIDGE IS ATTACHABLE, LEVER CONFIGURED TO CONTACT PORTION OF DEVELOPING CARTRIDGE, AND URGING MEMBER URGING LEVER

(71) Applicant: BROTHER KOGYO KABUSHIKI KAISHA, Nagoya (JP)

(72) Inventor: Keita Shimizu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/612,717

(22) Filed: Mar. 21, 2024

(65) Prior Publication Data

US 2024/0329588 A1 Oct. 3, 2024

(30) Foreign Application Priority Data

Apr. 3, 2023 (JP) ................................ 2023-059697

(51) Int. Cl.
*G03G 15/04* (2006.01)
*G03G 15/00* (2006.01)
*G03G 15/08* (2006.01)
*G03G 21/16* (2006.01)

(52) U.S. Cl.
CPC ....... *G03G 15/751* (2013.01); *G03G 15/0808* (2013.01); *G03G 15/0896* (2013.01); *G03G 21/1652* (2013.01)

(58) Field of Classification Search
CPC ........... G03G 15/0808; G03G 15/0896; G03G 15/751; G03G 21/1652
USPC ................................ 399/107, 110, 111, 119
See application file for complete search history.

(56) References Cited

U.S. PATENT DOCUMENTS 11,150,576 B2 * 10/2021 Wang ................ G03G 15/0806
11,493,878 B2 * 11/2022 Takeuchi .......... G03G 21/1676
2019/0302681 A1 10/2019 Wang et al.
2019/0302682 A1 10/2019 Wang et al.

FOREIGN PATENT DOCUMENTS

JP 2010-59510 A 3/2010
JP 2019-179128 A 10/2019
JP 2019-179129 A 10/2019
JP 2023003447 * 1/2023

* cited by examiner

*Primary Examiner* — Hoan H Tran
(74) *Attorney, Agent, or Firm* — Merchant & Gould P.C.

(57) ABSTRACT

A drum unit for use with an image forming apparatus includes: a drum frame to which a developing cartridge is attachable; a photosensitive drum positioned at the drum frame; a lever movable relative to the drum frame; and an urging member urging the lever. When the developing cartridge pivotally moves relative to the drum frame from a first position in which the lever faces a portion of the developing cartridge in a first direction with a gap between the lever and the portion of the developing cartridge to a second position in which the lever is in contact with the portion of the developing cartridge in a state where the developing cartridge is attached to the drum frame, the lever causes the developing cartridge to move from the second position to the first position by an urging force of the urging member.

18 Claims, 14 Drawing Sheets

DRUM UNIT INCLUDING DRUM FRAME TO WHICH DEVELOPING CARTRIDGE IS ATTACHABLE, LEVER CONFIGURED TO CONTACT PORTION OF DEVELOPING CARTRIDGE, AND URGING MEMBER URGING LEVER

REFERENCE TO RELATED APPLICATIONS

This application claims priority from Japanese Patent Application No. 2023-059697 filed on Apr. 3, 2023. The entire content of the priority application is incorporated herein by reference.

BACKGROUND ART

A prior art describes a conventional electrophotographic type image forming apparatus such as a laser printer or an LED printer. The conventional image forming apparatus includes a drum unit, and developing cartridges. The developing cartridges are attachable to the drum unit. Also, the drum unit to which the developing cartridges are attached is attachable to a main body of the image forming apparatus.

SUMMARY

In the conventional image forming apparatus, when the drum unit to which the developing cartridges are attached is attached to the image forming apparatus, and when the drum unit to which the developing cartridges are attached is detached from the image forming apparatus, the drum unit moves in a second direction relative to the main body of the image forming apparatus.

However, positions of the developing cartridges relative to the drum unit may be displaced when the drum unit moves in the second direction.

In view of the foregoing, it is an object of the present disclosure to provide a drum unit that can restrain a positional displacement of a developing cartridge relative to the drum unit.

In order to attain the above and other object, the present disclosure provides a drum unit for use with an image forming apparatus and including: a drum frame to which a developing cartridge is attachable; a photosensitive drum; a lever; and an urging member. The photosensitive drum is positioned at the drum frame. The lever is movable relative to the drum frame. The urging member urges the lever. When the developing cartridge pivotally moves relative to the drum frame from a first position in which the lever faces a portion of the developing cartridge in a first direction with a gap between the lever and the portion of the developing cartridge to a second position in which the lever is in contact with the portion of the developing cartridge in a state where the developing cartridge is attached to the drum frame, the lever causes the developing cartridge to move from the second position to the first position by an urging force of the urging member.

In the above structure, the lever causes the developing cartridge to move from the second position to the first position by the urging force of the urging member when the developing cartridge pivotally moves from the first position to the second position relative to the drum frame. Accordingly, a positional displacement of the developing cartridge relative to the drum frame can be restrained. Further, since the lever is not in contact with the portion of the developing cartridge in a state where the developing cartridge is in the first position, the developing cartridge in the first position does not receive any external force from the lever.

DESCRIPTION

Hereinafter, one embodiment of the present disclosure will be described while referring to the accompanying drawings.

In the following description, a direction in which a lever of a drum unit and a protrusion of a developing cartridge face each other in a state where the developing cartridge is attached to the drum unit will be referred to as "first direction". Further, a direction in which a pivot axis of the lever extends will be defined as "second direction". Still further, a direction in which a developing roller and a photosensitive drum contact each other in a state where the developing cartridge is attached to the drum unit will be referred to as "third direction".

The first direction and the second direction cross each other. Preferably, the first direction and the second direction are orthogonal to each other. The second direction and the third direction cross each other. Preferably, the second direction and the third direction are orthogonal to each other. The third direction and the first direction cross each other.

<1. Configuration of Image Forming Apparatus>

Figure 1:
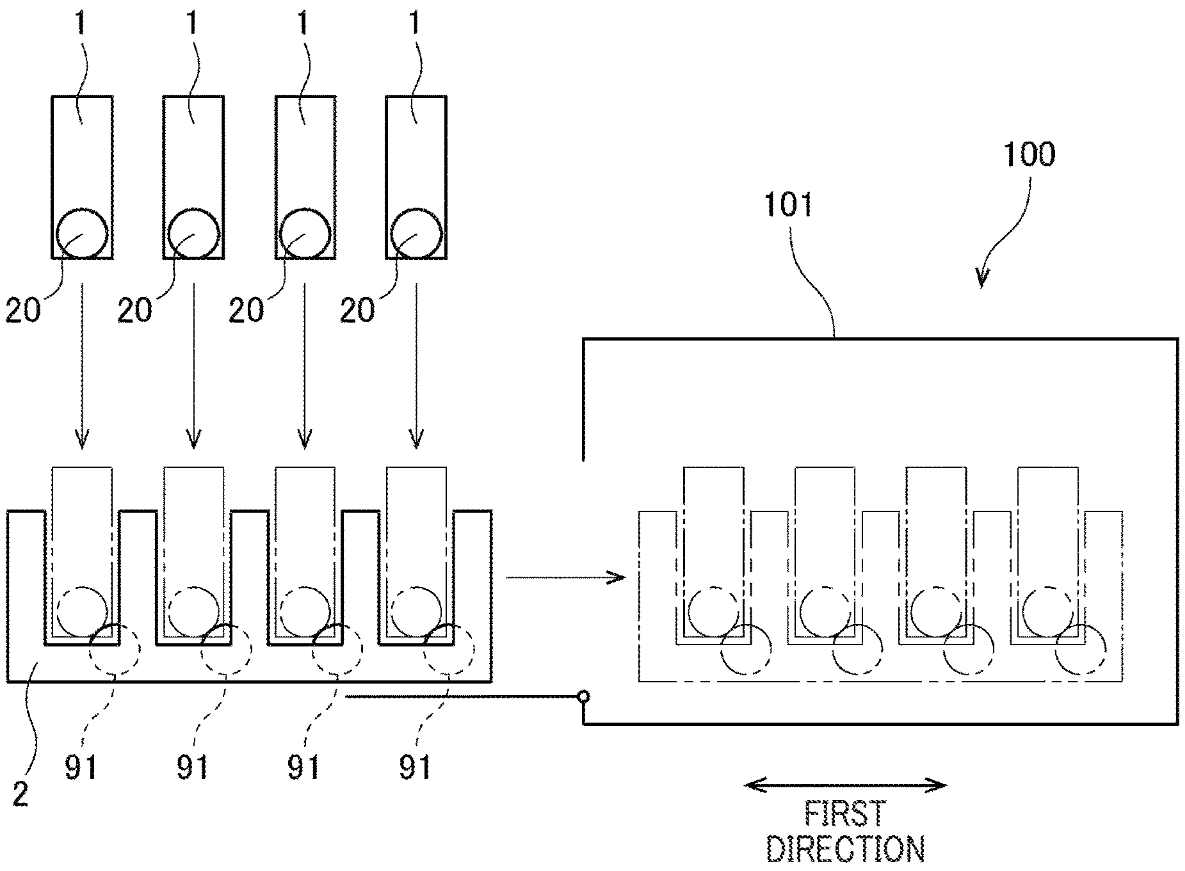
FIG. 1 is a schematic view of an image forming apparatus.

FIG. 1 is a schematic view of an image forming apparatus 100. The image forming apparatus 100 is an electrophotographic type printer. Specifically, the image forming apparatus 100 is a laser printer or an LED printer. As illustrated in FIG. 1, the image forming apparatus 100 includes a main frame 101, a drum unit 2, and four developing cartridges 1.

The four developing cartridges 1 are attachable to the drum unit 2. Also, the drum unit 2 to which the four developing cartridges 1 are attached is attachable to the main frame 101. By moving in the first direction relative to the main frame 101, attachment of the drum unit 2 to the main frame 101 is completed.

In a state where the four developing cartridges 1 are attached to the drum unit 2, the four developing cartridges 1 are arranged in the first direction in the order of the developing cartridge 1 accommodating therein toner of yellow, the developing cartridge 1 accommodating therein toner of magenta, the developing cartridge 1 accommodating therein toner of cyan, and the developing cartridge 1 accommodating therein toner of black, for example. The image forming apparatus 100 is configured to print an image on a surface of a printing paper using toner supplied from the developing cartridges 1.

<2. Configuration of Developing Cartridge>

Figure 2:
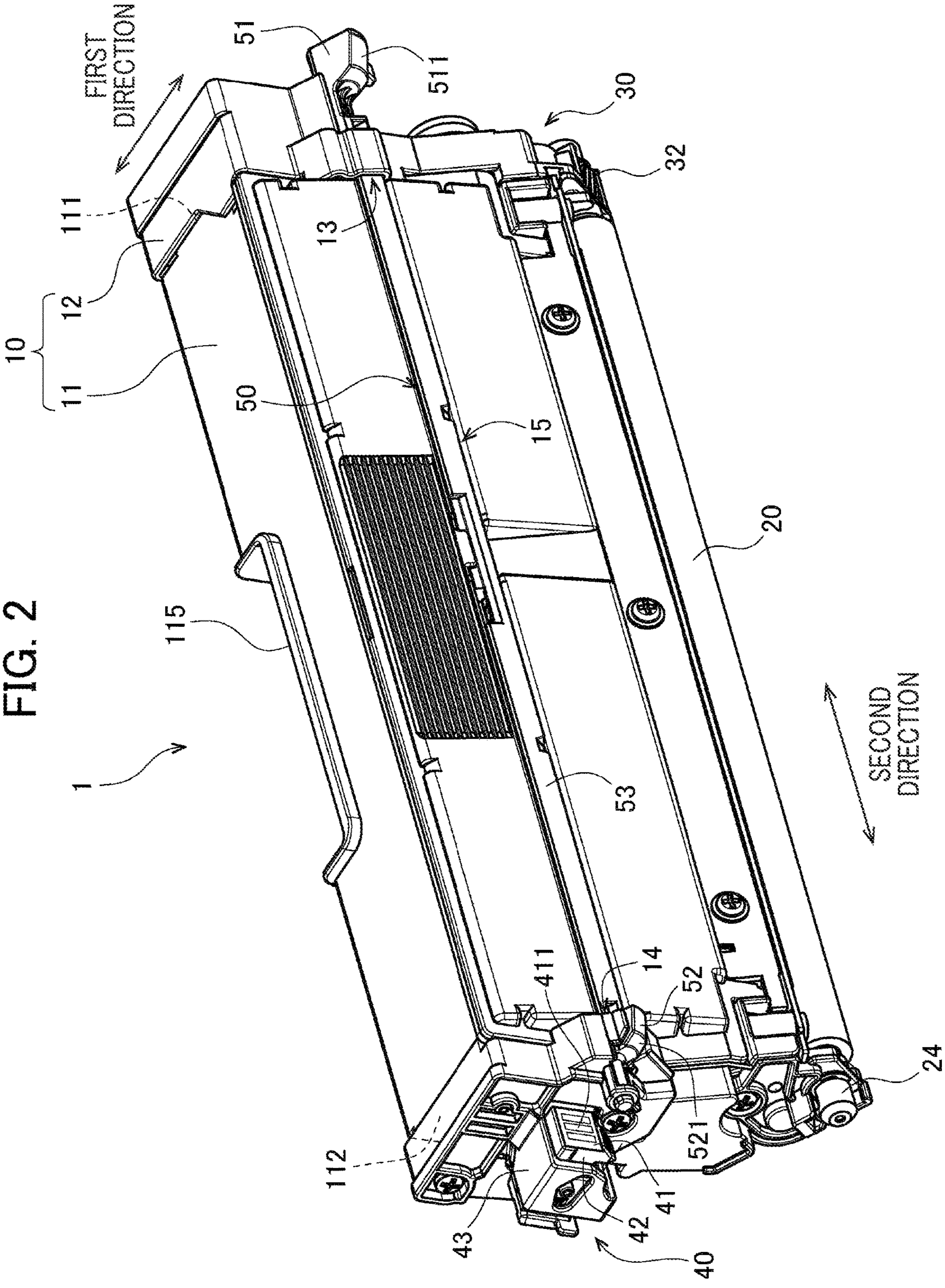
FIG. 2 is a perspective view of a developing cartridge.
Figure 3:
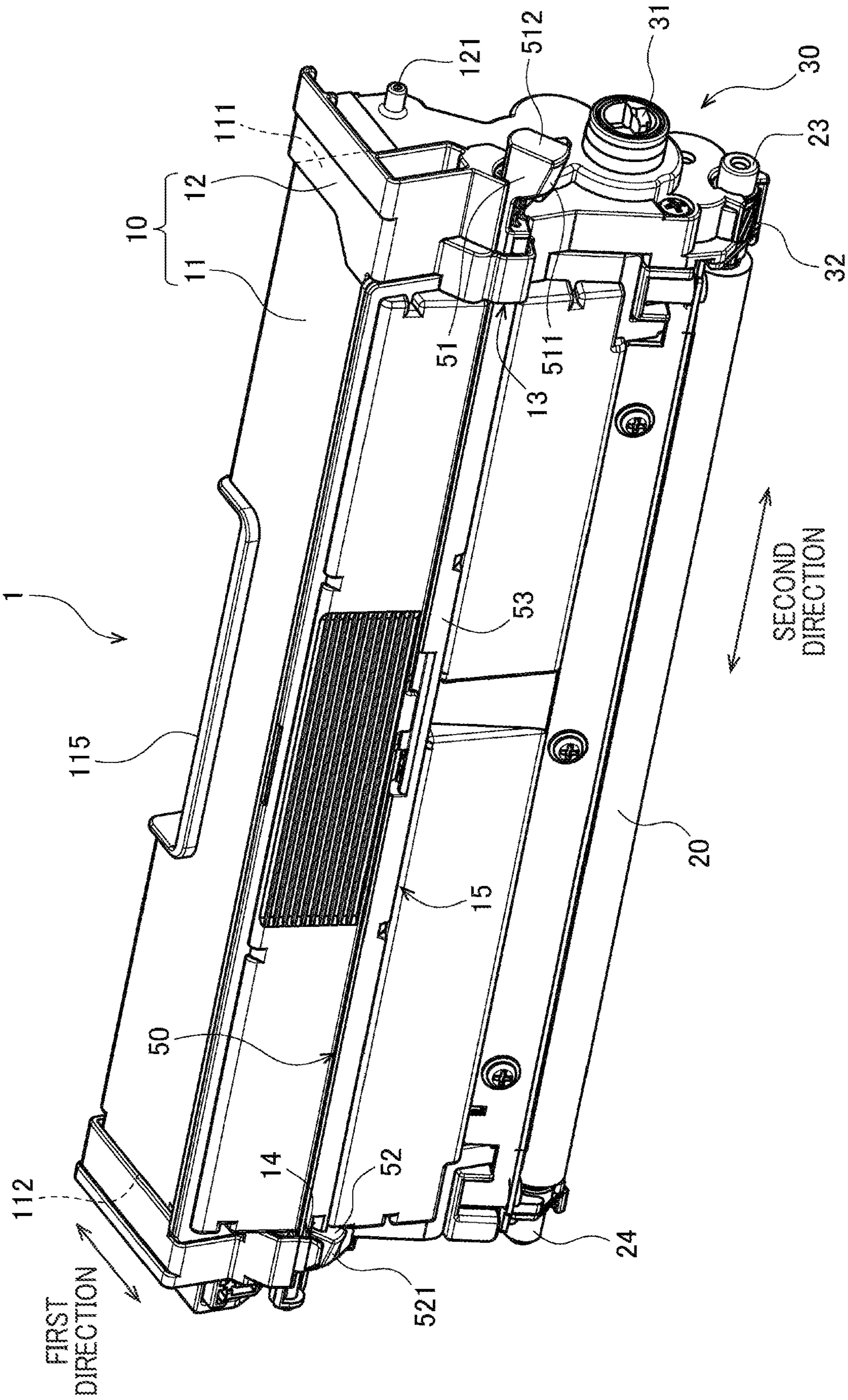
FIG. 3 is another perspective view of the developing cartridge.
Figure 4:
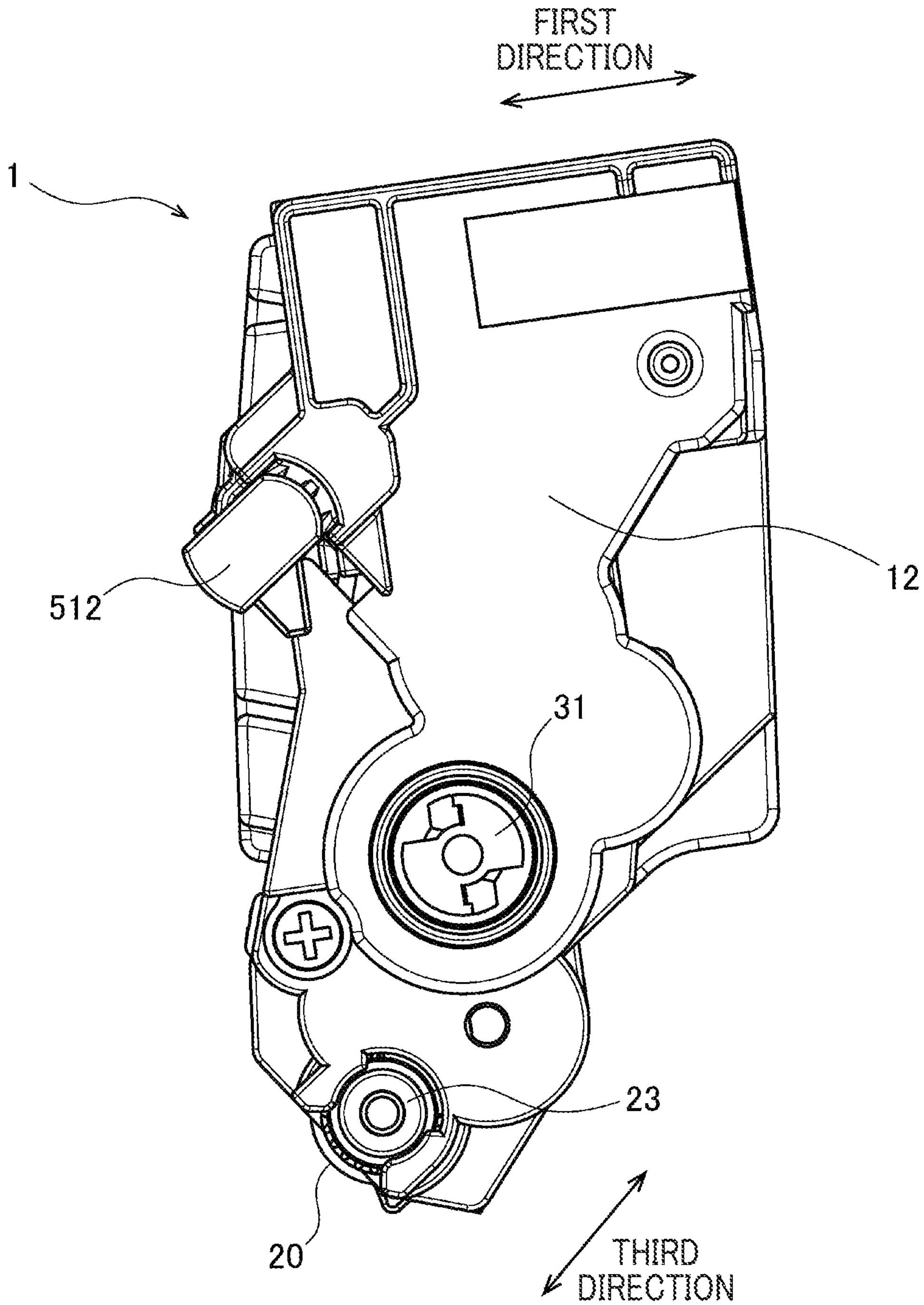
FIG. 4 is a side view of the developing cartridge as viewed in a second direction from a side at which a first outer surface is positioned.
Figure 5:
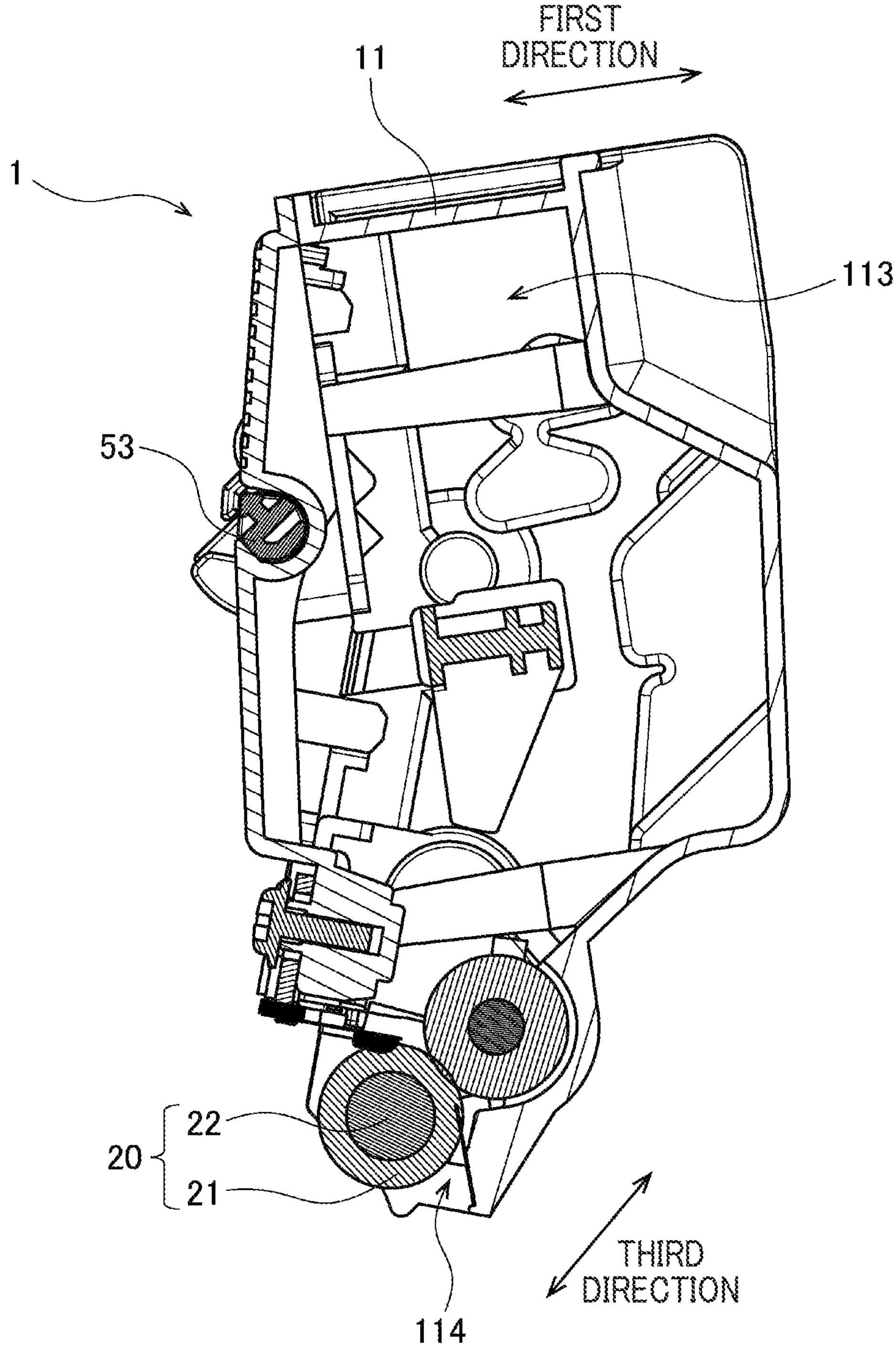
FIG. 5 is a cross-sectional view of the developing cartridge taken along a plane orthogonal to the second direction.

FIGS. 2 and 3 are perspective views of the developing cartridge 1. FIG. 4 is a side view of the developing cartridge 1 as viewed in the second direction from a side at which a gear cover 12 is positioned. FIG. 5 is a cross-sectional view of the developing cartridge 1 taken along a plane orthogonal to the second direction. As illustrated in FIGS. 2 to 5, the developing cartridge 1 includes a housing 10, a developing roller 20, a gear portion 30, a memory assembly 40, and a separation member 50.

<2-1. Housing>

The housing 10 includes a container 11 configured to accommodate toner therein, and the gear cover 12. The container 11 has a first outer surface 111, and a second outer surface 112. The first outer surface 111 is positioned at one end portion of the container 11 in the second direction. The second outer surface 112 is positioned at another end portion of the container 11 in the second direction. The first outer surface 111 and the second outer surface 112 are spaced apart from each other in the second direction.

An accommodation chamber 113 is formed inside the container 11. Toner is accommodated in the accommodation chamber 113. Also, as illustrated in FIG. 5, the container 11 also has an opening 114. The opening 114 is positioned at one end portion of the container 11 in the third direction. An outer space of the housing 10 and the accommodation chamber 113 are in communication with each other via the opening 114. As illustrated in FIGS. 2 and 3, the container 11 includes a handle 115. The handle 115 is positioned at another end portion of the container 11 in the third direction.

The gear cover 12 is attached to the first outer surface 111 of the container 11. Specifically, the gear cover 12 is fixed to the first outer surface 111 of the container 11 by a screw. The gear cover 12 includes a protrusion 121. The protrusion 121 protrudes from an outer surface of the gear cover 12 in the second direction. As such, the protrusion 121 is positioned at one end portion of the housing 10 in the second direction. The protrusion 121 extends outward in the second direction from an outer surface of the housing 10. The protrusion 121 is an example of the "portion of the developing cartridge".

The protrusion 121 has a circular columnar shape, for example. However, the protrusion 121 may have other shapes such as a prismatic columnar shape. The protrusion 121 is movable together with the housing 10 relative to the drum unit 2 in the first direction, in the second direction, and in the third direction.

In the present embodiment, the protrusion 121 and the gear cover 12 are formed as a single member. However, the protrusion 121 may be a separate member from the gear cover 12 as long as the protrusion 121 is fixed to the gear cover 12. Also, the protrusion 121 may extend from the container 11.

<2-2. Developing Roller>

The developing roller 20 is a roller rotatable about a developing axis extending in the second direction. The developing roller 20 is positioned at the opening 114 of the container 11. That is, the developing roller 20 is positioned at the one end portion of the container 11 in the third direction.

The developing roller 20 includes a developing roller body 21, and a developing shaft 22. The developing roller body 21 is a hollow cylindrical member and extends in the second direction. The developing roller body 21 is made of rubber having elasticity, for example. The developing shaft 22 has a solid cylindrical shape and extends in the second direction to penetrate the developing roller body 21 in the second direction. The developing roller body 21 is fixed to the developing shaft 22. The developing shaft 22 is made of metal or resin having electrical conductivity.

The developing shaft 22 has one end portion in the second direction to which a developing roller gear 32 of the gear portion 30 is coupled. The developing shaft 22 also has another end portion in the second direction which is supported by the second outer surface 112 of the container 11 via a bearing. In accordance with rotation of the developing roller gear 32, the developing roller body 21 and the developing shaft 22 rotate about the developing axis. Toner accommodated in the container 11 is carried on an outer circumferential surface of the developing roller body 21.

As illustrated in FIGS. 2 to 4, the developing cartridge 1 also includes a first collar 23, and a second collar 24. The first collar 23 is attached to the one end portion of the developing shaft 22 in the second direction, whereas the second collar 24 is attached to the other end portion of the developing shaft 22 in the second direction. Each of the first collar 23 and the second collar 24 has an outer circumferential surface having a hollow cylindrical shape centered on the developing axis. Each of the first collar 23 and the second collar 24 may be rotatable about the developing axis relative to the developing shaft 22. Each of the first collar 23 and the second collar 24 is an example of the "collar".

<2-3. Gear Portion>

The gear portion 30 is positioned at the first outer surface 111 of the container 11. The gear portion 30 includes a coupling 31, and a plurality of gears including the developing roller gear 32. Each of the coupling 31 and the plurality of gears is rotatable about its axis extending in the second direction. At least a part of the plurality of gears is positioned between the first outer surface 111 and the gear cover 12 in the second direction. That is, at least a part of the plurality of gears is covered by the gear cover 12.

The coupling 31 is exposed to an outside through the gear cover 12. Also, at least a part of the coupling 31 protrudes outward relative to the outer surface of the gear cover 12 in the second direction. When the drum unit 2 to which the developing cartridges 1 are attached is attached to the main frame 101, a driving shaft of the image forming apparatus 100 is coupled to the coupling 31 of the corresponding developing cartridge 1. In this state, a rotational force of the driving shaft is transmitted to the corresponding coupling 31 to rotate the same, and a rotational force of the coupling 31 is also transmitted to the plurality of gears including the developing roller gear 32.

<2-4. Memory Assembly>

The memory assembly 40 is positioned at the second outer surface 112 of the container 11. As illustrated in FIG. 2, the memory assembly 40 includes a memory 41, a holder 42, and a holder cover 43.

The memory 41 is a storage medium configured to store therein information related to the developing cartridge 1. The memory 41 is an IC chip, for example. In the memory 41, information related to a specification of the developing cartridge 1 or information related to a lifetime of the developing cartridge 1 is stored, for example. The memory 41 has an electrical contact surface 411. The electrical contact surface 411 is electrically connected to a memory cell of the memory 41. The electrical contact surface 411 is positioned at one end portion of the holder 42 in the first direction. In the present embodiment, the memory 41 is held on the one end portion of the holder 42 in the first direction. However, of components configuring the memory 41, only the electrical contact surface 411 may be held on the holder 42, and the memory cell of the memory 41 may be held on a portion the developing cartridge 1 other than the holder 42.

The holder cover 43 is attached to the second outer surface 112 of the container 11. At least a part of the holder 42 is covered by the holder cover 43. The holder 42 is positioned between the second outer surface 112 of the container 11 and the holder cover 43 in the second direction. The holder 42 is movable relative to the housing 10 and the holder cover 43 in the first direction, in the second direction, and in the third direction. Hence, the electrical contact surface 411 of the memory 41 is also movable relative to the housing 10 and the holder cover 43 in the first direction, in the second direction, and in the third direction.

<2-5. Separation Member>

In a state where the drum unit 2 to which the four developing cartridges 1 are attached is attached to the main frame 101, the image forming apparatus 100 can perform a separating operation for each of the four developing cartridges 1. The separating operation is an operation for moving the developing roller 20 relative to a corresponding photosensitive drum 91 (described later) from a contacting position in which the developing roller 20 is in contact with the corresponding photosensitive drum 91 to a separated position in which the developing roller 20 is in separation from the corresponding photosensitive drum 91.

The image forming apparatus 100 performs the separating operation for the developing cartridge 1 that is not used among the four developing cartridges 1. Through this operation, the developing roller 20 of the developing cartridge 1 that is not used can be separated from the corresponding photosensitive drum 91.

The separation member 50 is a member for switching a position of the developing roller 20 between the contacting position and the separated position described above. In other words, the developing cartridge 1 is switchable, by the separation member 50, from a state in which the developing roller 20 is in the contacting position to a state in which the developing roller 20 is in the separated position. As illustrated in FIG. 4, the separation member 50 is positioned between one end portion of the housing 10 in the third direction and another end portion of the housing 10 in the third direction.

As illustrated in FIGS. 2 and 3, the separation member 50 includes a first cam 51, a second cam 52, and a separation shaft 53. The separation member 50 is made of resin, for example. Specifically, the first cam 51, the second cam 52, and the separation shaft 53 are integrally molded with resin. However, the first cam 51, the second cam 52, and the separation shaft 53 may be separate components from one another. In the latter case, the first cam 51 and the second cam 52 may be made of resin, whereas the separation shaft 53 may be made of metal.

As illustrated in FIGS. 2 and 3, the developing cartridge 1 has a first through-hole 13, a second through-hole 14, and a guide recess 15. The guide recess 15 is positioned at the outer surface of the housing 10. The first through-hole 13 is positioned at one end portion of the developing cartridge 1 in the second direction and extends in the second direction. The second through-hole 14 is positioned at another end portion of the developing cartridge 1 in the second direction and extends in the second direction. The guide recess 15 is positioned between the first through-hole 13 and the second through-hole 14 in the second direction. The guide recess 15 extends in the second direction on the outer surface of the housing 10.

The separation shaft 53 is disposed in the guide recess 15 and extends in the second direction along the guide recess 15. One end portion of the separation shaft 53 in the second direction is inserted through the first through-hole 13, whereby the one end portion of the separation shaft 53 in the second direction is supported by the housing 10. On the other hand, another end portion of the separation shaft 53 in the second direction is inserted through the second through-hole 14, whereby the other end portion of the separation shaft 53 in the second direction is supported by the housing 10.

The first cam 51 is positioned at one end portion of the separation member 50 in the second direction. The first cam 51 has a first inclined surface 511, and a pressure receiving surface 512. The first inclined surface 511 is a part of a peripheral surface of the first cam 51 centered on the separation shaft 53. The first inclined surface 511 is inclined relative to the second direction. Specifically, the first inclined surface 511 is inclined so as to extend away from the developing roller 20 in the third direction as extending toward another end portion of the separation member 50 in the second direction. The pressure receiving surface 512 is positioned at one end of the first cam 51 in the second direction. The pressure receiving surface 512 is a surface crossing the second direction.

The second cam 52 is positioned at the other end portion of the separation member 50 in the second direction. The second cam 52 has a second inclined surface 521. The second inclined surface 521 is a part of a peripheral surface of the second cam 52 centered on the separation shaft 53. The second inclined surface 521 is inclined relative to the second direction. Specifically, the second inclined surface 521 is inclined so as to extend away from the developing roller 20 in the third direction as extending toward the other end portion of the separation member 50 in the second direction.

The separation member 50 is movable in the second direction between a standby position and a pressure position relative to the housing 10 and the developing roller 20. The separation member 50 in the standby position is positioned further toward the other end portion of the separation member 50 in the second direction relative to the separation member 50 in the standby position. Hence, movement of the separation member 50 from the standby position to the pressure position denotes movement in a direction from the first cam 51 toward the second cam 52.

The developing cartridge 1 further includes a spring (not illustrated) for urging the separation member 50. The spring is configured to expand and contract in the second direction. The spring is positioned between the first outer surface 111 of the container 11 and the first cam 51 while the spring is compressed in the second direction to have a length that is smaller than the natural length thereof. Hence, the separation member 50 is urged toward the standby position from the pressure position due to an elastic force of the spring. Accordingly, the separation member 50 is in the standby position in a state where no external force is applied thereto.

When the image forming apparatus 100 performs the separating operation in a state where the drum unit 2 to which the four developing cartridges 1 are attached is attached to the main frame 101, the image forming apparatus 100 presses the first cam 51 in the second direction toward the second cam 52. Specifically, the image forming apparatus 100 applies a pressing force directed in the second direction against the pressure receiving surface 512 of the first cam 51. As a result, the spring is contracted by the pressing force and the separation member 50 moves from the standby position to the pressure position relative to the housing 10.

In a prosses in which the separation member 50 moves from the standby position to the pressure position, the first inclined surface 511 moves in the second direction while contacting a drum frame 92 (described later) of the drum unit 2. At this time, the first cam 51 moves in the third direction relative to the drum unit 2 due to a reaction force applied from the drum frame 92. Specifically, the first cam 51 moves in a direction away from the photosensitive drum 91 relative to the drum unit 2 due to the reaction force applied from the drum frame 92.

Similarly, in the prosses in which the separation member 50 moves from the standby position to the pressure position, the second inclined surface 521 moves in the second direction while contacting the drum frame 92. At this time, the second cam 52 moves in the third direction relative to the drum unit 2 by a reaction force applied from the drum frame 92. Specifically, the second cam 52 moves in a direction away from the photosensitive drum 91 relative to the drum unit 2 by the reaction force applied from the drum frame 92.

As a result, both the housing 10 and the developing roller 20 move in the third direction relative to the drum unit 2 together with the separation member 50. More specifically, both the housing 10 and the developing roller 20 move in a direction away from the photosensitive drum 91 relative to the drum unit 2. Consequently, the developing roller 20 moves in the third direction from the contacting position in which the developing roller 20 is in contact with the photosensitive drum 91 to the separated position in which the developing roller 20 is in separation from the photosensitive drum 91.

<3. Configuration of Drum Unit>

Figure 6:
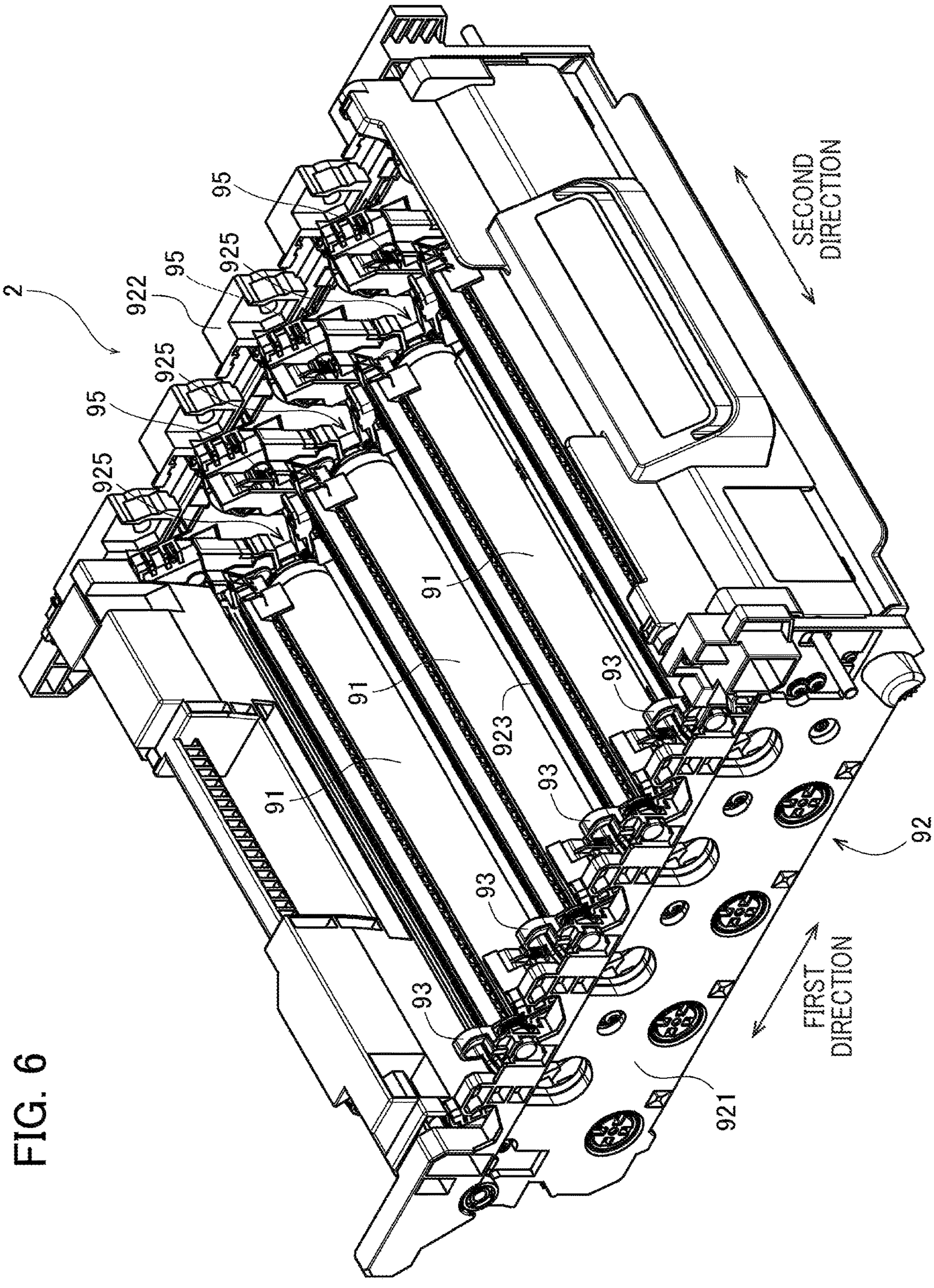
FIG. 6 is a perspective view of a drum unit.
Figure 7:
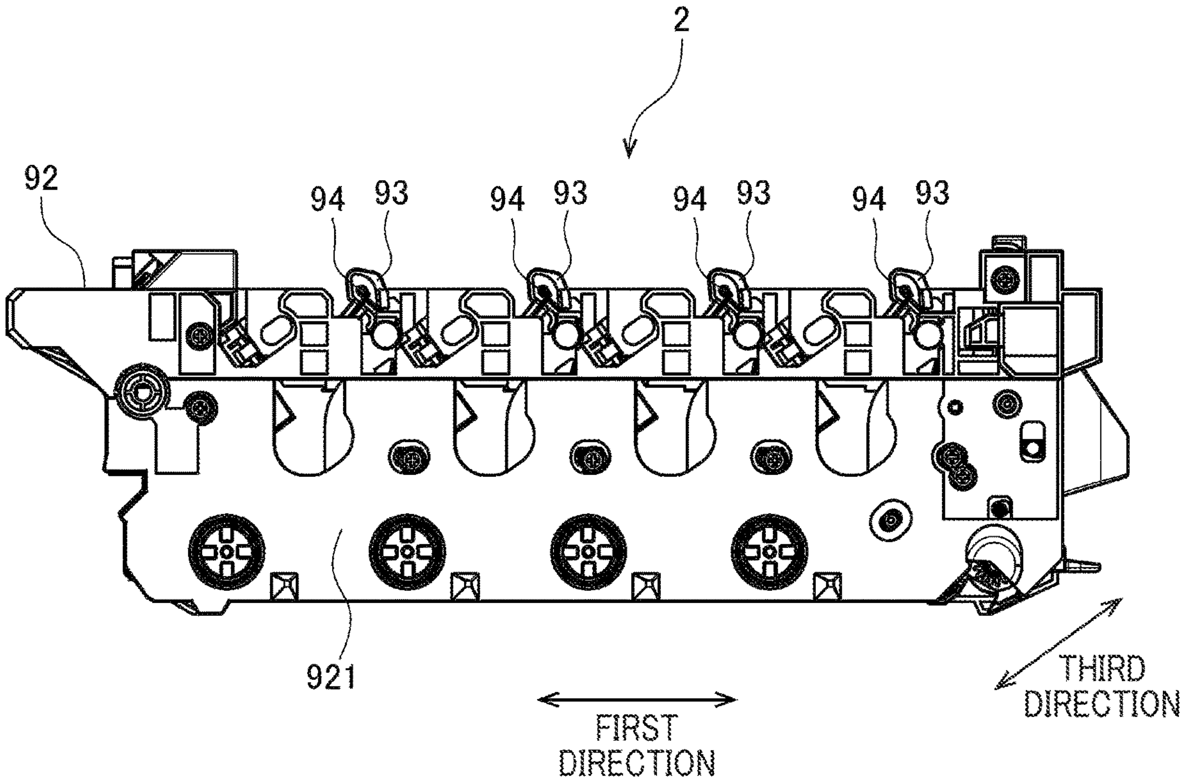
FIG. 7 is a side view of the drum unit as viewed in the second direction.
Figure 8:
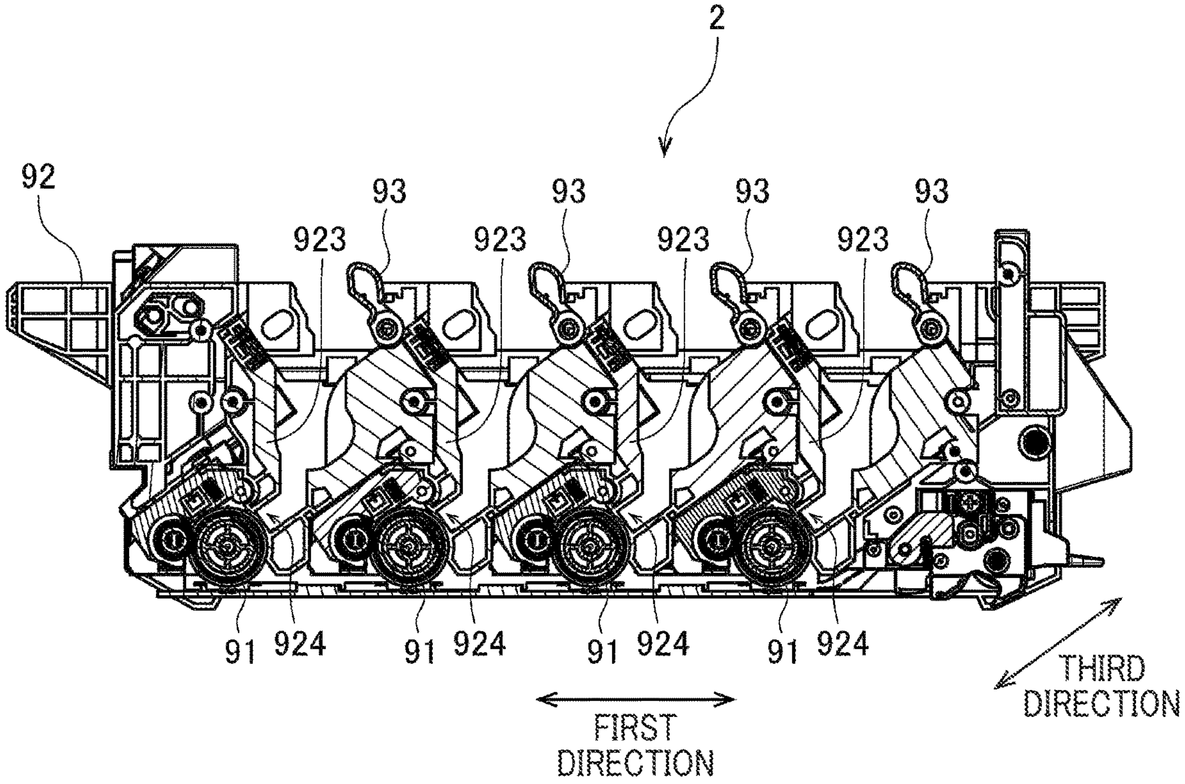
FIG. 8 is a cross-sectional view of the drum unit taken along a plane orthogonal to the second direction.

FIG. 6 is a perspective view of the drum unit 2. FIG. 7 is a side view of the drum unit 2 as viewed in the second direction. FIG. 8 is a cross-sectional view of the drum unit 2 taken along a plane orthogonal to the second direction. As illustrated in FIGS. 6 to 8, the drum unit 2 includes the four photosensitive drums 91, the drum frame 92, four levers 93, and four urging members 94.

<3-1. Photosensitive Drums>

The photosensitive drums 91 are positioned at one end portion of the drum unit 2 in the third direction. Each of the photosensitive drums 91 has a hollow cylindrical outer circumferential surface centered on a drum axis extending in the second direction. The outer circumferential surface of each photosensitive drum 91 is coated with photosensitive material.

As an example, the four photosensitive drums 91 are arranged in the first direction in the order of the photosensitive drum 91 corresponding to toner of yellow, the photosensitive drum 91 corresponding to toner of magenta, the photosensitive drum 91 corresponding to toner of cyan, and the photosensitive drum 91 corresponding to toner of black.

The photosensitive drum 91 corresponding to toner of yellow and the photosensitive drum 91 corresponding to toner of magenta are arranged so as to be spaced apart from each other in the first direction. The photosensitive drum 91 corresponding to toner of magenta and the photosensitive drum 91 corresponding to toner of cyan are arranged so as to be spaced apart from each other in the first direction. The photosensitive drum 91 corresponding to toner of cyan and the photosensitive drum 91 corresponding to toner of black are arranged so as to be spaced apart from each other in the first direction.

<3-2. Drum Frame>

The drum frame 92 supports the four photosensitive drums 91 such that the photosensitive drums 91 are rotatable about their drum axes. The drum frame 92 includes a first side frame 921, a second side frame 922, and connection frames 923. The first side frame 921 is positioned at one end portion of the drum frame 92 in the second direction. The second side frame 922 is positioned at another end portion of the drum frame 92 in the second direction. The first side frame 921 and the second side frame 922 are spaced apart from each other in the second direction. The connection frames 923 connect the first side frame 921 and the second side frame 922 to each other in the second direction.

The four developing cartridges 1 are attachable to the drum frame 92. In a state where the developing cartridges 1 are attached to the drum frame 92, the housing 10 of each developing cartridge 1 is positioned between the first side frame 921 and the second side frame 922 in the second direction. Also, in a state where the developing cartridges 1 are attached to the drum frame 92, the developing roller 20 of each developing cartridge 1 and the corresponding photosensitive drum 91 contact each other in the third direction. Specifically, the outer circumferential surface of the developing roller 20 and the outer circumferential surface of the corresponding photosensitive drum 91 contact each other in the third direction. Accordingly, toner carried on the outer circumferential surface of the developing roller 20 can be supplied to the photosensitive drum 91.

The drum frame 92 has four first recesses 924 (see FIG. 8) and four second recesses 925 (see FIG. 6). One first recess 924 and one second recess 925 are formed at each of the connection frames 923. The first recess 924 is positioned at one end portion of the corresponding connection frame 923 in the second direction. The second recess 925 is positioned at another end portion of the corresponding connection frame 923 in the second direction. However, the first recesses 924 may be provided at the first side frame 921, and the second recesses 925 may be provided at the second side frame 922. The first recesses 924 and the second recesses 925 are recessed toward the photosensitive drum 91 in the third direction. Each of the first recess 924 and the second recess 925 is an example of the "recess".

The drum unit 2 also includes electrical terminals 95. The electrical terminals 95 are attached to the second side frame 922. In a state where the four developing cartridges 1 are attached to the drum frame 92, the electrical contact surface 411 of the memory 41 of each developing cartridge 1 contacts the corresponding electrical terminal 95. As a result, the memory 41 and the corresponding electrical terminal 95 are electrically connected to each other.

In a state where the drum frame 92 to which the developing cartridges 1 are attached is attached to the main frame 101, the electrical terminals 95 are electrically connected to a controller of the image forming apparatus 100, thereby enabling the controller of the image forming apparatus 100 to perform at least one of: reading of information from the memories 41; and writing of information to the memories 41.

<3-3. Levers and Urging Members>

The levers 93 and the urging members 94 are members for restraining displacement of the corresponding developing cartridges 1 relative to the drum frame 92 in a state where the developing cartridges 1 are attached to the drum frame 92. The levers 93 and the urging members 94 are positioned at the one end portion of the drum frame 92 in the second direction. Specifically, the levers 93 and the urging members 94 are attached to the first side frame 921.

Figure 9:
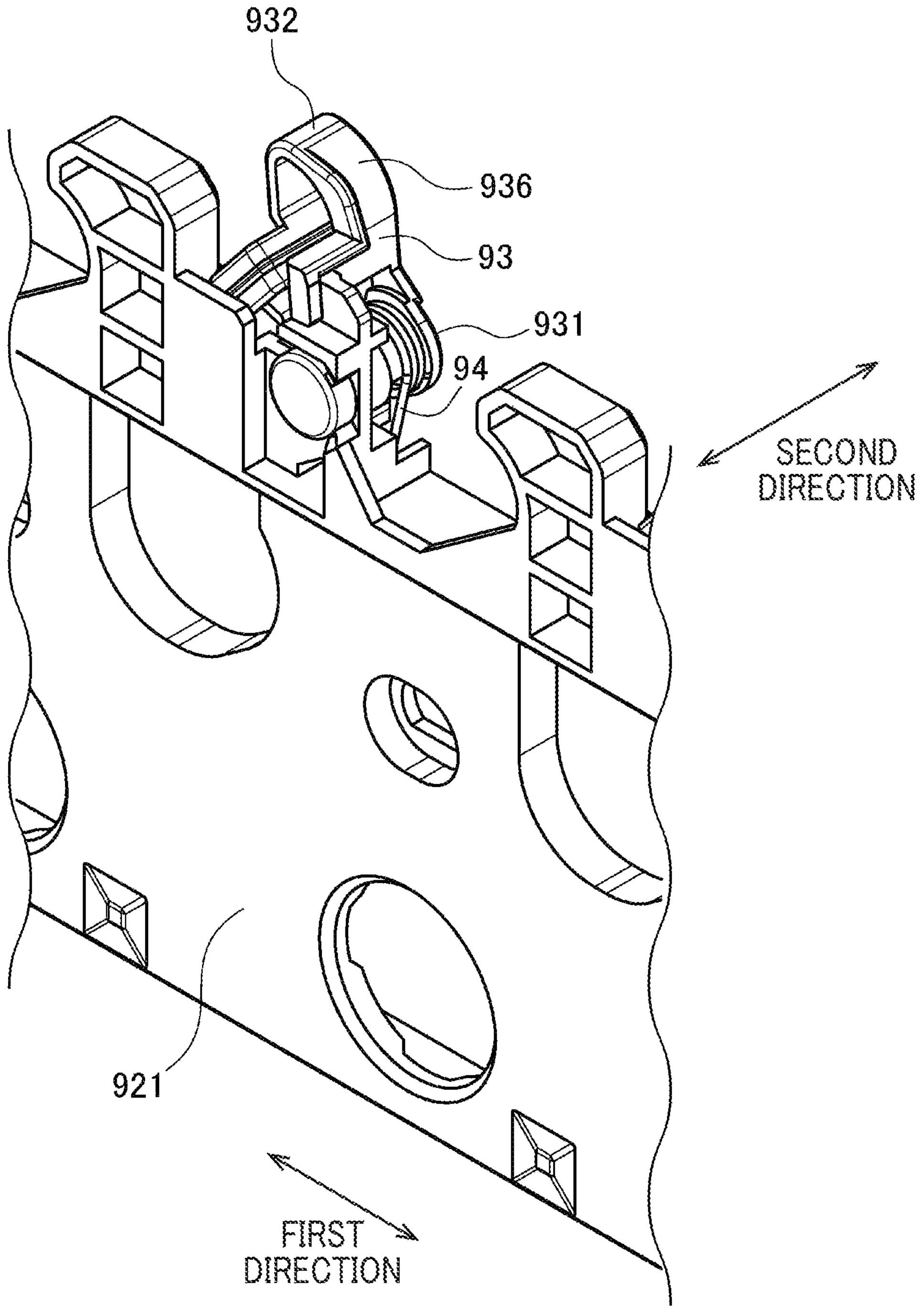
FIG. 9 is a partial perspective view of the drum unit.
Figure 10:
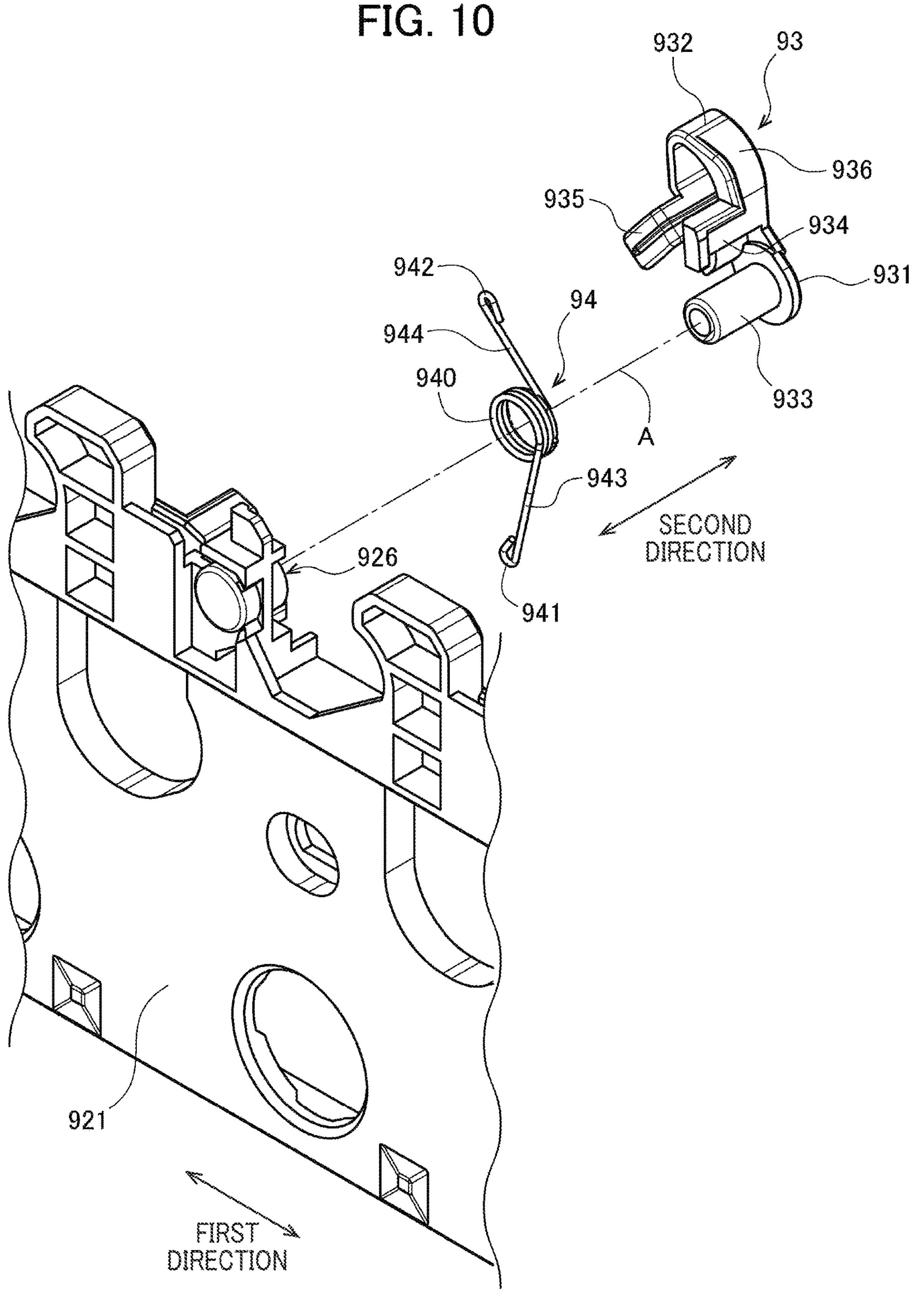
FIG. 10 is a partial exploded perspective view of the drum unit.

FIG. 9 is a partial perspective view of the drum unit 2. FIG. 10 is a partial exploded perspective view of the drum unit 2. As illustrated in FIGS. 9 and 10, each of the levers 93 has a first end portion 931 and a second end portion 932, and includes a lever shaft 933. The lever shaft 933 extends from the first end portion 931 in the second direction. The lever shaft 933 has a solid cylindrical shape centered on a pivot axis A extending in the second direction. The second end portion 932 is positioned outward relative to the first end portion 931 in a radial direction of the lever shaft 933 about the pivot axis A. That is, a distance between the second end portion 932 and the pivot axis A in the radial direction is greater than a distance between the first end portion 931 and the pivot axis A in the radial direction.

In the meantime, the first side frame 921 has bearings 926. Each of the bearings 926 is a hole having a circular shape centered on the pivot axis A. The lever shaft 933 is inserted through the corresponding bearing 926. With this configuration, the lever 93 is supported by the first side frame 921 so as to be pivotally movable about the pivot axis A relative to the first side frame 921. In other words, the second end portion 932 pivotally moves about the pivot axis A relative to the first end portion 931 of lever 93.

The lever 93 also includes a first stopper 934, and a second stopper 935. The first stopper 934 and the second stopper 935 are arranged in a circumferential direction of the lever shaft 933 centered on the pivot axis A. The lever 93 is pivotally movable about the lever shaft 933 between a first lever position in which the first stopper 934 contacts the first side frame 921, and a second lever position in which the second stopper 935 contacts the first side frame 921.

The urging member 94 is a member for urging the lever 93 from the second lever position toward the first lever position. The urging member 94 is a spring, for example. The urging member 94 has one end 941, and another end 942. The one end 941 is in contact with the first side frame 921, whereas the other end 942 is in contact with the second end portion 932 of the lever 93. A distance between the one end 941 and the other end 942 in the first direction can be changed (i.e., can increase and decrease) by expansion and contraction of the urging member 94.

In the present embodiment, a torsion coil spring is employed as the urging member 94. The urging member 94 includes a coil portion 940 having a spiral shape, a first arm 943, and a second arm 944. The lever shaft 933 is inserted through the coil portion 940. The first arm 943 and the second arm 944 extend outward from the coil portion 940 in the radial direction of the lever shaft 933. A distal end of the first arm 943 serves as the one end 941 of the urging member 94 described above. A distal end of the second arm 944 serves as the other end 942 of the urging member 94 described above.

The distance between the one end 941 of the urging member 94 and the other end 942 of the urging member 94 in the first direction is shortened in comparison with a state where the urging member 94 is in the natural length (i.e., no external force is applied to the urging member 94). Hence, the urging member 94 constantly urges the lever 93 relative to the first side frame 921 from the second lever position toward the first lever position due to an elastic force of the urging member 94.

<4. Attachment of Developing Cartridge to Drum Unit>

Figure 11:
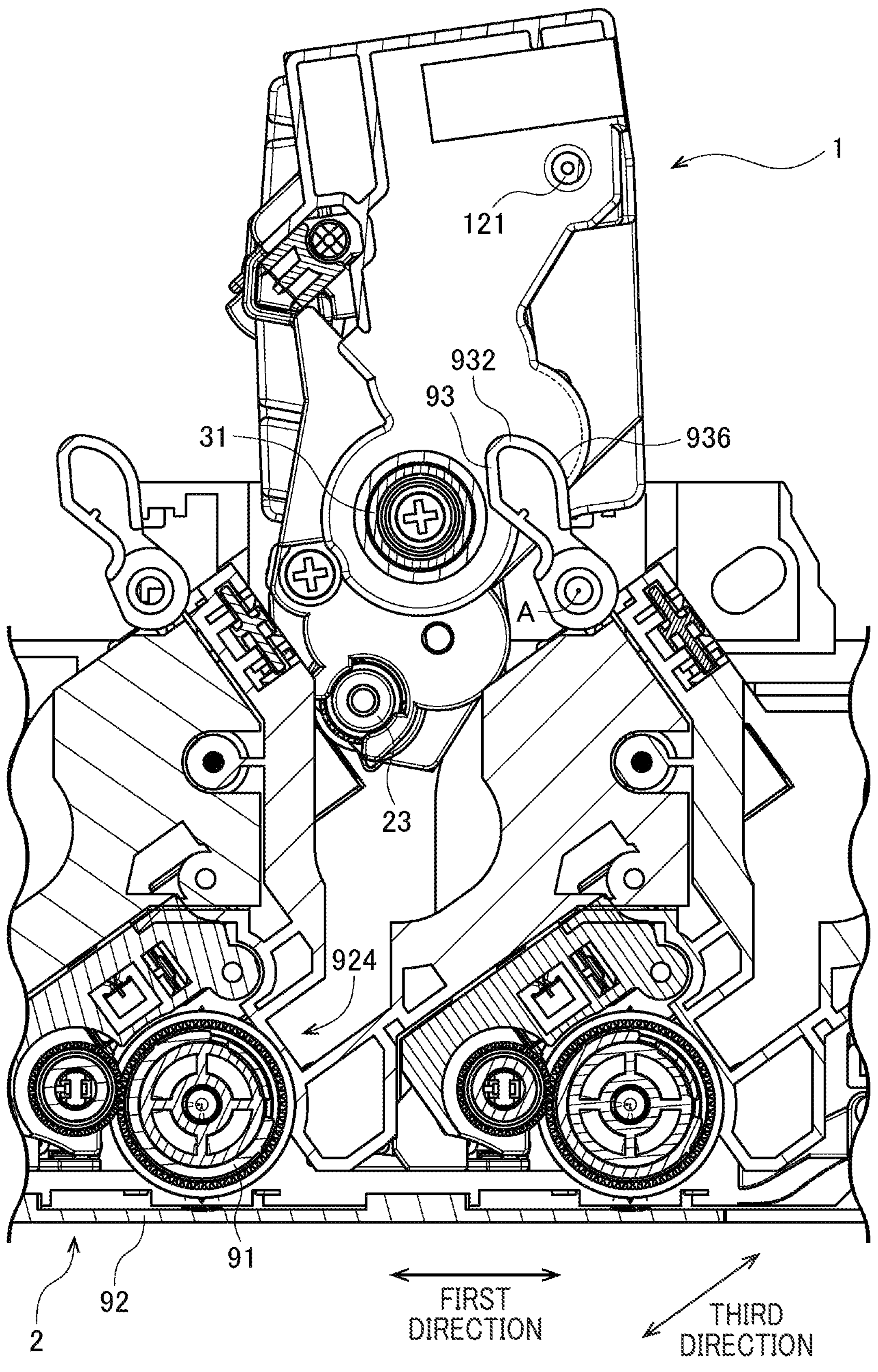
FIG. 11 is a cross-sectional view illustrating a process of attachment of the developing cartridge to the drum unit.
Figure 12:
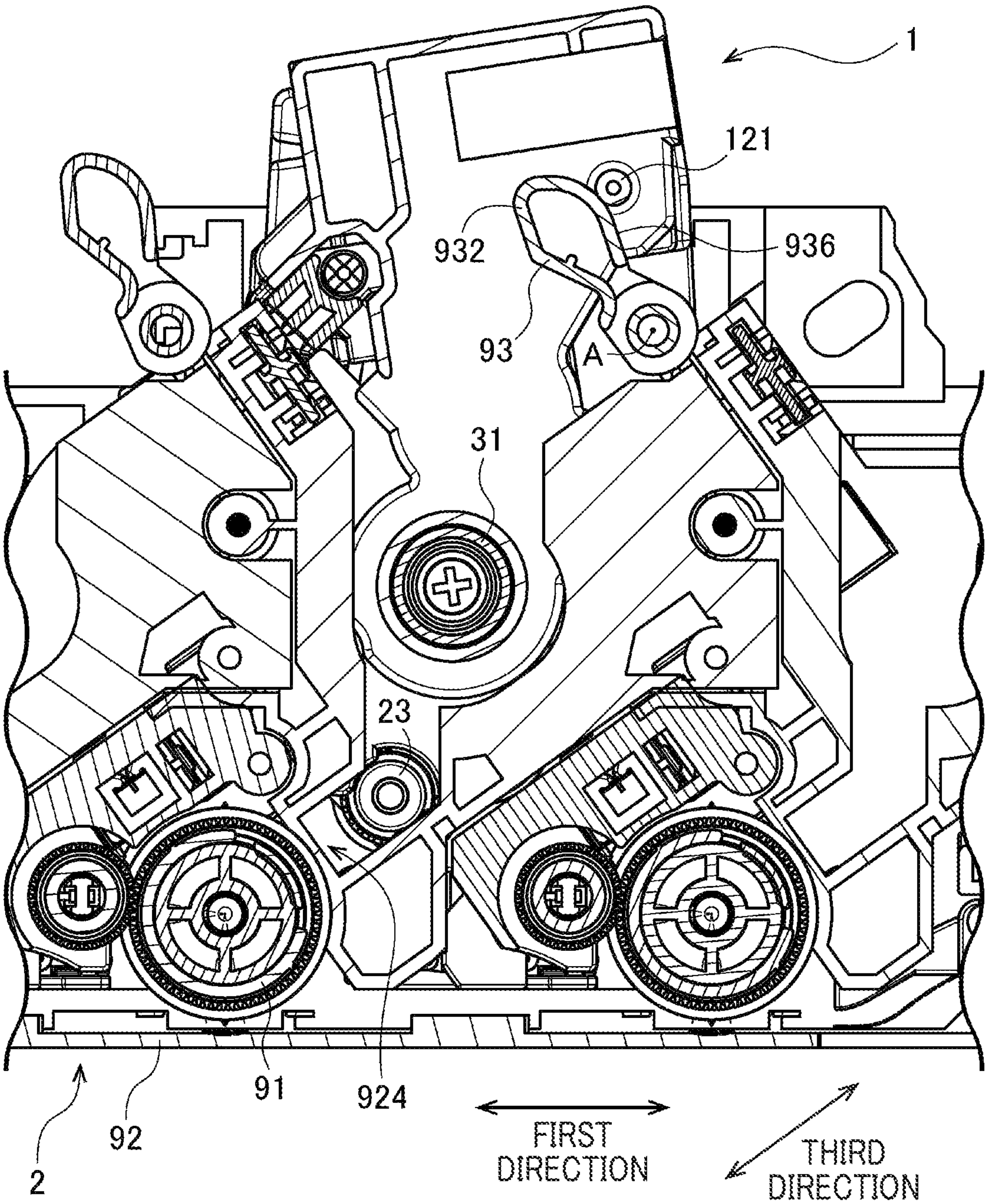
FIG. 12 is another cross-sectional view illustrating the process of the attachment of the developing cartridge to the drum unit.
Figure 13:
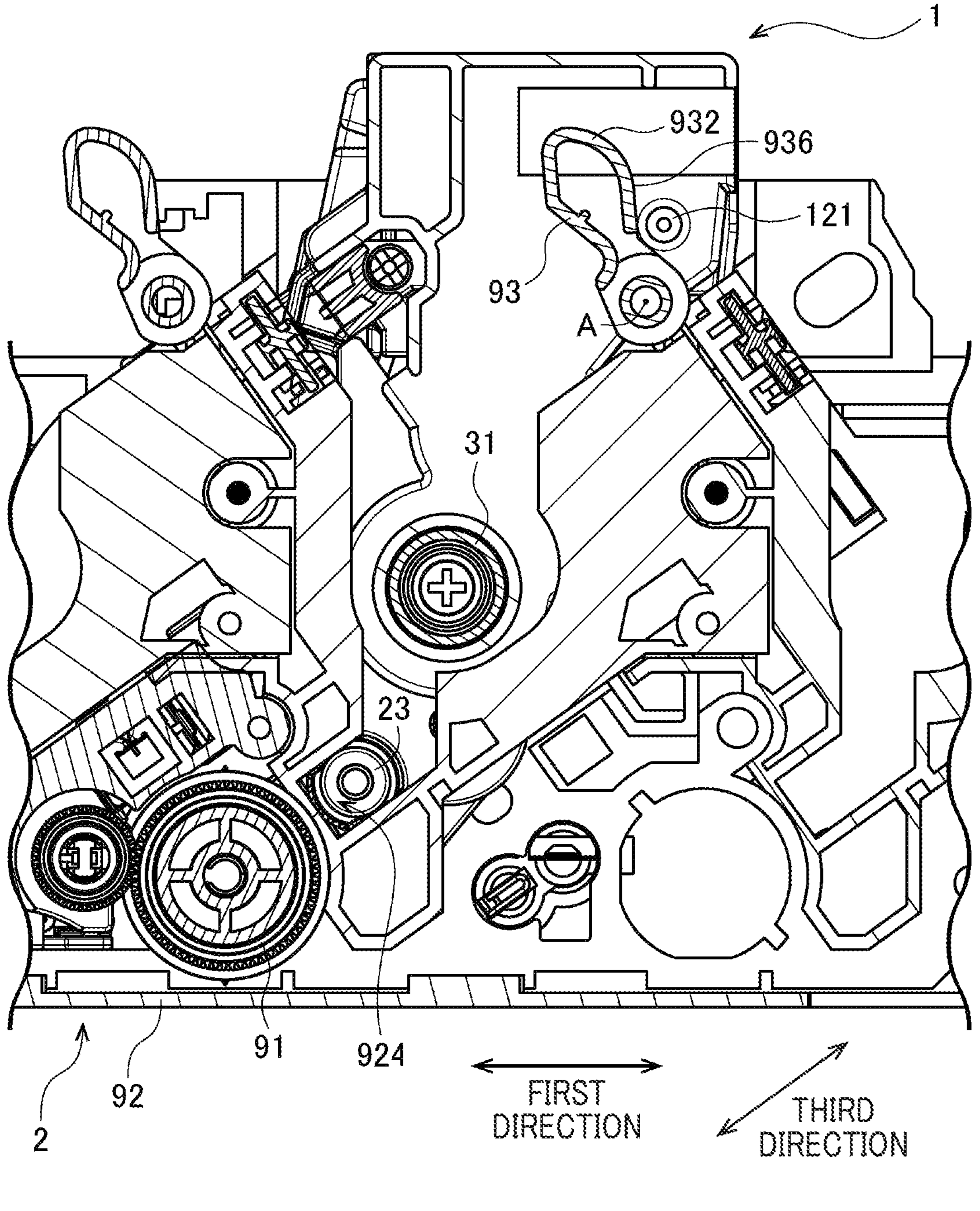
FIG. 13 is still another cross-sectional view illustrating the process of the attachment of the developing cartridge to the drum unit.

Next, an operation for attaching the developing cartridge 1 to the drum unit 2 will be described. FIGS. 11 to 13 are views illustrating a process of the attachment of the developing cartridge 1 to the drum unit 2. FIGS. 11 to 13 illustrate a cross-section of the developing cartridge 1 and the drum unit 2 taken along a plane that is orthogonal to the second direction and passes through the lever 93.

As illustrated in FIG. 11, the developing cartridge 1 moves toward the corresponding photosensitive drum 91 of the drum unit 2. In a state illustrated in FIG. 11, the lever 93 is in the first lever position by the elastic force of the urging member 94. In this state, the coupling 31 moves past the lever 93. That is, while the lever 93 is placed in the first lever position, the coupling 31 moves from a position in which the coupling 31 is farther from the photosensitive drum 91 than the lever 93 is from the photosensitive drum 91 to a position in which the coupling 31 is closer to the photosensitive drum 91 than the lever 93 is to the photosensitive drum 91.

The second end portion 932 of the lever 93 has a guide surface 936. Of surfaces of the second end portion 932, the guide surface 936 is a surface that faces in a direction opposite the photosensitive drum 91 in the third direction. The guide surface 936 is inclined so as to extend away from the photosensitive drum 91 in the first direction as extending toward the photosensitive drum 91 in a direction in which the developing cartridge 1 is attached to the drum frame 92.

After the coupling 31 moves to a position in which the coupling 31 is closer to the photosensitive drum 91 than the lever 93 is to the photosensitive drum 91, the protrusion 121 of the developing cartridge 1 is brought into contact with the guide surface 936 of the lever 93, as illustrated in FIG. 12. The protrusion 121 presses the lever 93 in the third direction, thereby pivotally moving the lever 93 from the first lever position to the second lever position about the pivot axis A.

Hereinafter, a position of the developing cartridge 1 relative to the drum frame 92 which is illustrated in FIG. 12, i.e., a position when the protrusion 121 contacts the lever 93 and the lever 93 is in the second lever position will be referred to as “third position”. When the developing cartridge 1 is in the third position, the first collar 23 is positioned outside the first recess 924, and the second collar 24 is positioned outside the second recess 925. The protrusion 121 of the developing cartridge 1 further moves from this state toward the first end portion 931 of the lever 93 along the guide surface 936 of the lever 93.

In accordance with movement of the protrusion 121 toward the first end portion 931 of the lever 93 along the guide surface 936 of the lever 93, the developing cartridge 1 pivotally moves relative to the drum frame 92. Accordingly, the first collar 23 is inserted in the first recess 924 and the second collar 24 is inserted in the second recess 925. The lever 93 pivotally moves back from the second lever position to the first lever position by an urging force of the urging member 94. Hereinafter, a position of the developing cartridge 1 relative to the drum frame 92 when the protrusion 121 contacts the lever 93 and the lever 93 is in the first lever position will be referred to as “second position”.

Thereafter, the developing cartridge 1 further pivotally moves relative to the drum frame 92, and the protrusion 121 separates away from the lever 93 as illustrated in FIG. 13.

Specifically, the protrusion 121 moves away from the lever 93 in the first direction. Hereinafter, a position of the developing cartridge 1 relative to the drum frame 92 when the protrusion 121 and the lever 93 face each other in the first direction with a gap therebetween will be referred to as "first position". In a state where the developing cartridge 1 is in the first position, the first collar 23 is positioned within the first recess 924, and the second recess 925 is positioned within the second recess 925.

As such, in a process of the attachment of the developing cartridge 1 to the drum unit 2, the developing cartridge 1 pivotally moves relative to the drum frame 92 from the third position to the first position via the second position. Since the developing cartridge 1 is positioned at the first position, the lever 93 faces the protrusion 121, which is a portion of the developing cartridge 1, with a gap between the lever 93 and the protrusion 121 in the first direction.

The drum unit 2 further includes a pressure mechanism (not illustrated). The pressure mechanism includes a spring. The pressure mechanism presses the housing 10 of the developing cartridge 1 in the first position toward the photosensitive drum 91 in the third direction. With this configuration, the developing roller 20 is pressed against the photosensitive drum 91.

<5. Attachment and Detachment of Drum Unit to and from Main Frame>

When the drum unit 2 to which the developing cartridges 1 are attached is attached to the main frame 101, and when the drum unit 2 to which the developing cartridges 1 are attached is detached from the main frame 101, the drum unit 2 moves relative to the main frame 101 in the first direction.

At this time, an inertial force directed in the first direction is applied to each developing cartridge 1 attached to the drum unit 2, which may cause the developing cartridge 1 to pivotally move from the first position to the second position described above relative to the drum frame 92. However, when the developing cartridge 1 pivotally moves from the first position to the second position, the protrusion 121 contacts the lever 93. Specifically, the protrusion 121 contacts the second end portion 932 of the lever 93 at the first lever position, whereby the lever 93 presses back the protrusion 121 by the urging force of the urging member 94. Consequently, the developing cartridge 1 returns from the second position toward the first position.

As described above, using the lever 93, the drum unit 2 restrains the pivotal movement of the developing cartridge 1 from the first position to the second position relative to the drum frame 92. This configuration can restrain unintentional detachment of the developing cartridge 1 from the drum unit 2 due to the inertial force generated when the drum unit 2 moves relative to the main frame 101 in the first direction.

In a state where the developing cartridge 1 is in the first position, the lever 93 does not contact the protrusion 121. Therefore, in a state where the developing cartridge 1 is in the first position, the developing cartridge 1 does not receive any force from the lever 93.

<6. Detachment of Developing Cartridge from Drum Unit>

When the developing cartridge 1 is detached from the drum unit 2, the developing cartridge 1 pivotally moves from the first position illustrated in FIG. 13 to the second position. Then, the developing cartridge 1 further pivotally moves from the second position to the third position illustrated in FIG. 12 against the urging force of the urging member 94. Accordingly, the first collar 23 moves from an inside of the first recess 924 to an outside of the first recess 924, and the second collar 24 moves from an inside of the second recess 925 to an outside of the second recess 925. Also, the lever 93 pivotally moves from the first lever position to the second lever position about the pivot axis A.

Thereafter, the developing cartridge 1 moves in a direction away from the photosensitive drum 91 from the state illustrated in FIG. 12 to the state illustrated in FIG. 11. At this time, since the protrusion 121 moves away from the lever 93, the lever 93 pivotally moves from the second lever position to the first lever position due to the urging force of the urging member 94.

<7. Separating Operation>

Figure 14:
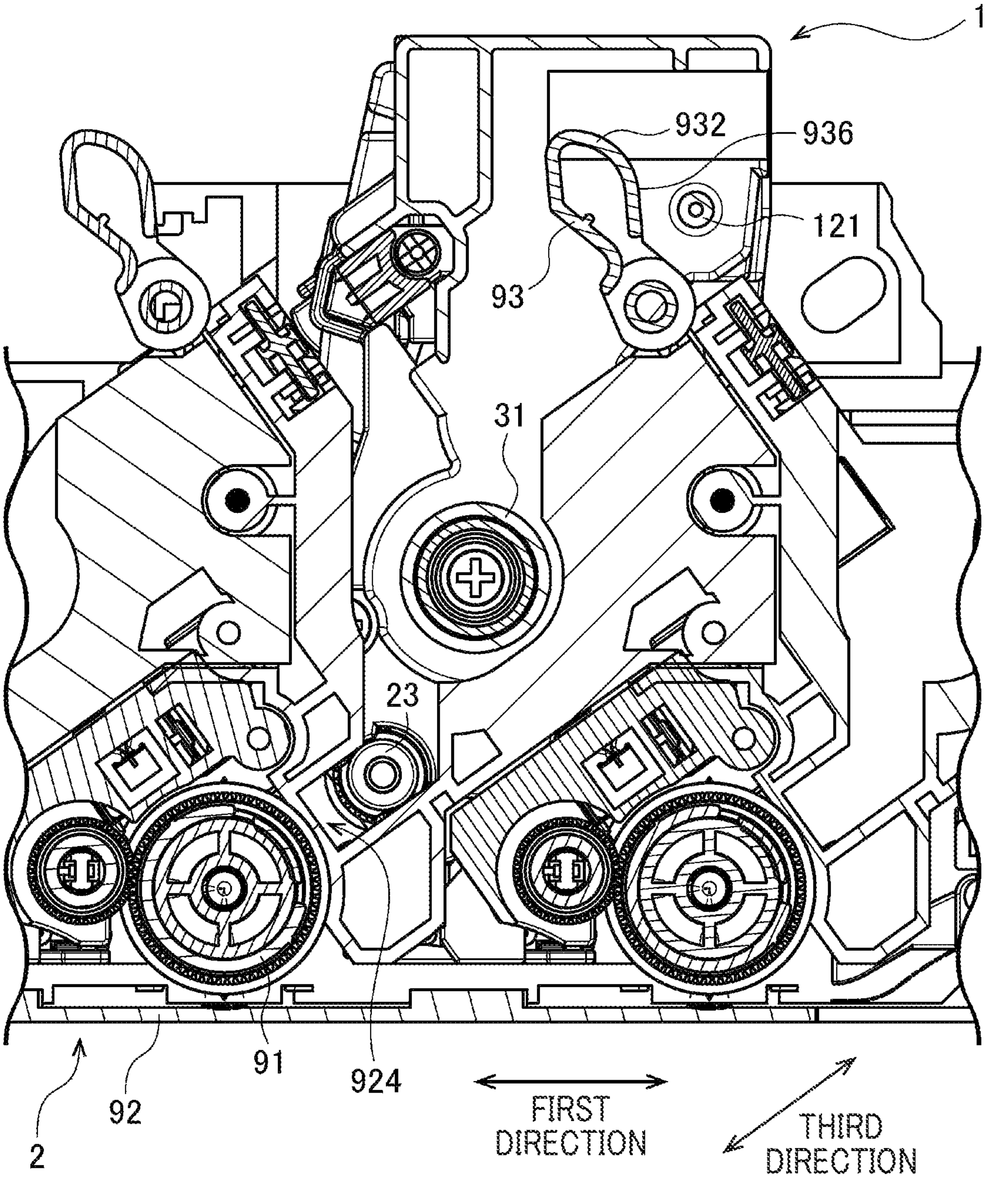
FIG. 14 is a cross-sectional view illustrating a state where a separating operation is performed.

FIG. 14 illustrates a state in which the separating operation is performed using the separation member 50 described above. FIG. 14 shows a cross-section of the developing cartridge 1 and the drum unit 2 taken along a plane that is orthogonal to the second direction and passes through the lever 93.

In a state where the developing cartridge 1 is attached to the drum frame 92, the lever 93 is positioned between the photosensitive drum 91 and the protrusion 121 in the third direction. With this arrangement, during the separating operation, the protrusion 121 can move in a direction away from the photosensitive drum 91 in the third direction without being interfered by the lever 93, as illustrated in FIG. 14.

<8. Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the lever 93 is pivotally movable about the pivot axis A. However, the lever 93 may be movable relative to the drum frame 92 without pivotal moving, as long as the lever 93 can move the developing cartridge 1 from the second position to the first position due to the urging force of the urging member 94. For example, the lever 93 may be movable linearly relative to the drum frame 92.

In the embodiment described above, the four developing cartridges 1 are attachable to the drum unit 2. However, the drum unit 2 may be modified to receive one through three developing cartridges 1, or greater than or equal to five developing cartridges 1.

Further, the parts and the components appearing in the above-described embodiment and modifications may be combined or omitted as appropriate as long as any contradiction is avoided.

What is claimed is:

1. A drum unit for use with an image forming apparatus, the drum unit comprising:

a drum frame to which a developing cartridge is attachable;

a photosensitive drum positioned at the drum frame;

a lever movable relative to the drum frame; and an urging member urging the lever, wherein, when the developing cartridge pivotally moves relative to the drum frame from a first position in which the lever faces a portion of the developing cartridge in a first direction with a gap between the lever and the portion of the developing cartridge to a second position in which the lever is in contact with the portion of the developing cartridge in a state where the developing cartridge is attached to the drum frame, the lever causes the developing cartridge to move from the second position to the first position by an urging force of the urging member.

2. The drum unit according to claim 1,
wherein the lever is pivotally movable about a pivot axis extending in a second direction crossing the first direction.

3. The drum unit according to claim 2,
wherein the first direction and the second direction are orthogonal to each other.

4. The drum unit according to claim 2,
wherein the developing cartridge includes:
a housing configured to accommodate toner therein; and
a protrusion extending in the second direction from the housing, the protrusion being the portion of the developing cartridge, and
wherein the lever faces the protrusion in the first direction with a gap between the lever and the protrusion in a state where the developing cartridge is in the first position.

5. The drum unit according to claim 4,
wherein the developing cartridge further includes a developing roller, and
wherein, in a state where the developing cartridge is attached to the drum frame:
the developing roller contacts the photosensitive drum in a third direction crossing both the first direction and the second direction; and
the lever is positioned between the photosensitive drum and the protrusion in the third direction.

6. The drum unit according to claim 5,
wherein the second direction and the third direction are orthogonal to each other.

7. The drum unit according to claim 5,
wherein the developing cartridge further includes a separation member having a pressure receiving surface, the pressure receiving surface being configured to receive a pressing force directed in the second direction from the image forming apparatus in a state where the drum frame to which the developing cartridge is attached is attached to the image forming apparatus, the separation member causing, by the pressing force, the developing roller to move in the third direction from a contacting position in which the developing roller is in contact with the photosensitive drum to a separated position in which the developing roller is in separation from the photosensitive drum,
wherein the protrusion is positioned at one end portion of the housing in the second direction, and
wherein the pressure receiving surface is positioned at the one end portion of the housing in the second direction.

8. The drum unit according to claim 4,
wherein the protrusion contacts the lever during a process of attachment of the developing cartridge to the drum frame.

9. The drum unit according to claim 8,
wherein the lever has a guide surface inclined so as to extend away from the photosensitive drum in the first direction as extending toward the photosensitive drum in a direction in which the developing cartridge is attached to the drum frame, and
wherein the protrusion contacts the guide surface during the process of attachment of the developing cartridge to the drum frame.

10. The drum unit according to claim 8,
wherein the developing cartridge pivotally moves from the second position to the first position during the process of attachment of the developing cartridge to the drum frame.

11. The drum unit according to claim 10,
wherein the developing cartridge further includes:
a developing roller including a developing shaft extending in the second direction; and
a collar attached to one end portion of the developing shaft in the second direction,
wherein the drum frame has a recess, and
wherein the collar is positioned within the recess in a state where the developing cartridge is in the first position.

12. The drum unit according to claim 4,
wherein the developing cartridge further includes a coupling extending in the second direction from the housing, and
wherein the protrusion contacts the lever after the coupling moves to a position in which the coupling is closer to the photosensitive drum than the lever is to the photosensitive drum during a process of attachment of the developing cartridge to the drum frame.

13. The drum unit according to claim 2,
wherein the lever is positioned at one end portion of the drum frame in the second direction.

14. The drum unit according to claim 13,
wherein the developing cartridge includes a memory having an electrical contact surface,
the drum unit further comprising an electrical terminal positioned at another end portion of the drum frame in the second direction, the electrical terminal contacting the electrical contact surface in a state where the developing cartridge is attached to the drum frame.

15. The drum unit according to claim 1,
wherein the urging member has:
one end in contact with the drum frame; and
another end in contact with the lever, and
wherein a distance in the first direction between the one end and the another end can be increased and decreased by expansion and contraction of the urging member.

16. The drum unit according to claim 1,
wherein the urging member is a spring.

17. The drum unit according to claim 1,
wherein the drum unit is attachable to the image forming apparatus in the first direction.

18. The drum unit according to claim 1,
wherein the drum unit allows the developing cartridge to pivotally move from the first position to the second position and to further pivotally move from the second position to a third position against the urging force of the urging member during a process of detachment of the developing cartridge from the drum frame.

* * * * *